(12) United States Patent
Barnett

(10) Patent No.: US 6,568,640 B1
(45) Date of Patent: May 27, 2003

(54) INFLATABLE SATELLITE DESIGN

(75) Inventor: David M. Barnett, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/610,231

(22) Filed: Jul. 5, 2000

Related U.S. Application Data

(60) Provisional application No. 60/145,168, filed on Jul. 22, 1999.

(51) Int. Cl.[7] ................................................. B64G 1/44
(52) U.S. Cl. .................................... 244/173; 244/158 R
(58) Field of Search ............................. 244/173, 158 R

(56) References Cited

U.S. PATENT DOCUMENTS

| | | | | |
|---|---|---|---|---|
| 3,144,219 A | * | 8/1964 | Schinitzer | 114/116 |
| 3,220,004 A | * | 11/1965 | Gillespie | 156/165 |
| 3,459,391 A | * | 8/1969 | Haynos | 136/245 |
| 3,735,943 A | * | 5/1973 | Philippe | 136/245 |
| 4,030,102 A | * | 6/1977 | Kaplan et al. | 136/245 |
| 4,730,797 A | * | 3/1988 | Minovitch | 244/159 |
| 5,044,579 A | * | 9/1991 | Bernasconi | 244/158 R |
| 5,386,953 A | | 2/1995 | Stuart | 244/158 R |
| 5,527,001 A | * | 6/1996 | Stuart | 244/158 R |
| 5,990,851 A | * | 11/1999 | Henderson et al. | 343/915 |

* cited by examiner

Primary Examiner—Charles T. Jordan
Assistant Examiner—Stephen A Holzen
(74) Attorney, Agent, or Firm—Townsend and Townsend and Crew LLP

(57) ABSTRACT

The invention is a satellite assembly suitable for use with small payloads. In detail, the invention includes a foldable flexible sheet. A housing for containing the payload of the satellite is mounted at the center of the sheet. A plurality of inflatable tubular members is coupled at a first end to the housing and along it's length to the sheet having a second end terminating at the periphery of the sheet, the tubular elements movable from a collapsed condition to an inflated condition. A plurality of flat solar panels is attached to the sheet in a manner allowing the sheet to be folded.

14 Claims, 4 Drawing Sheets

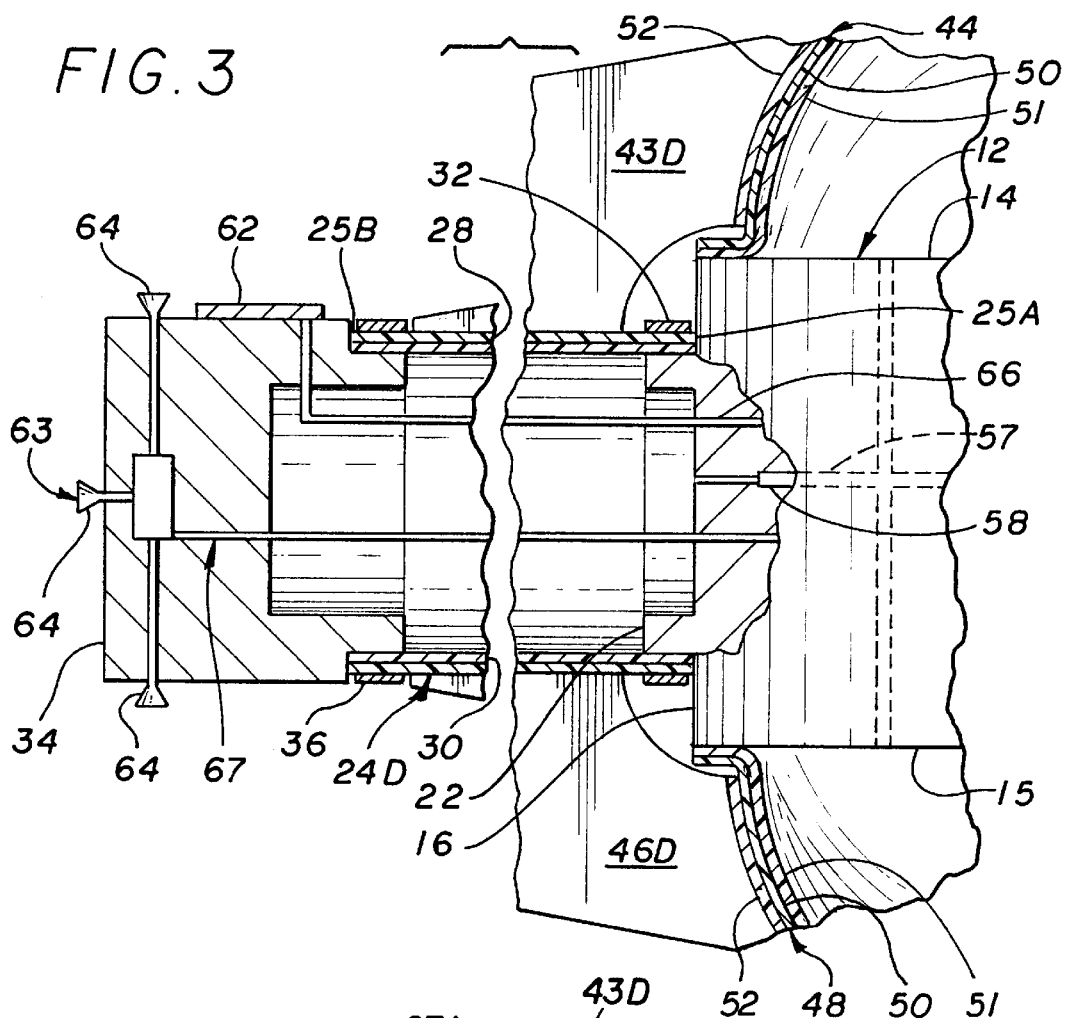
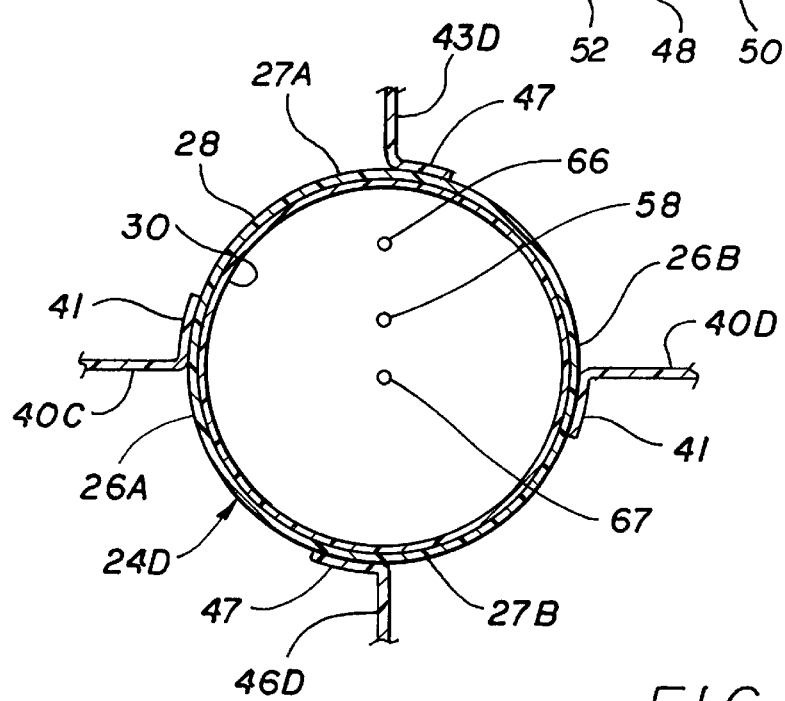

INFLATABLE SATELLITE DESIGN

REFERENCE TO RELATED APPLICATIONS

This application is a continuation-in-part of Provisional Patent Application Ser. No. 60/145,168 "Inflatable Nano-Satellite", filed Jul. 22, 1999.

BACKGROUND OF THE INVENTION

1. Field of the Invention

The invention relates to the field of satellites and, in particular, to inflatable satellites.

2. Description of Related Art

Inflatable satellites are old in the art. For example, the ECHO satellite launched in the early dates of space flight was a large balloon with a reflective coating. Of course, later designs such as disclosed in U.S. Pat. No. 5,386,953 "Spacecraft Designs For Satellite Communication System" by J. R. Stuart were far more sophisticated communications satellite including an inflatable torus shaped structure incorporating an array of antennas and solar cells. However, this design does not store in a very small volume, nor is it light in weight. In addition, continued pressurization is required to insure that its shape is maintained. Thus a large supply of pressurized gas is required in order to maintain internal pressurization over a long time period. Therefore there is a need for a low cost and small size satellite that can be used for missions requiring small payloads.

Thus, it is a primary object of the invention to provide an inflatable satellite design.

It is another primary object of the invention to provide an inflatable satellite design that stores in a very small volume when un-inflated.

It is a further object of the invention to provide an inflatable satellite design that once inflated remains rigidized upon elimination of internal pressurization.

SUMMARY OF THE INVENTION

The invention is a satellite assembly suitable for use with small payloads. In detail, the invention includes a foldable flexible sheet. A housing for containing the payload of the satellite is mounted at the center of the sheet. A plurality of inflatable tubular members is coupled at a first end to the housing and along it's length to the sheet having a second end terminating at the periphery of the sheet, the tubular elements movable from a collapsed condition to an inflated condition. A plurality of flat solar panels is attached to the sheet in a manner allowing the sheet to be folded.

A system is included for internally pressurizing the tubular members such that they become rigid. In addition, it is preferable to include a system for rigidizing the tubular members after inflation such that should internal pressure be lost, the tubular members remain rigid. Typically, this is accomplished by coating the interior of the tubular members with an ultra-violet curing resin, such that when the satellite is placed in orbit, exposure to ultra-violet radiation from the sun cures the resin coating, thereby rigidizing the tubular members.

Preferably the solar arrays are mounted about a portion of the foldable flexible sheet connected to the housing. Another approach is to have the solar arrays comprise a series of rectangular shaped panels mounted in a space relationship such that the foldable flexible sheet is foldable along the spaces between the rectangular shaped panels.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a is a cross-sectional view of FIG. 1 taken along the line 3—3.

FIG. 4 is a cross-sectional view of FIG. 1 taken along the line 4—4.

DESCRIPTION OF THE PREFERRED EMBODIMENT

Figure 1:
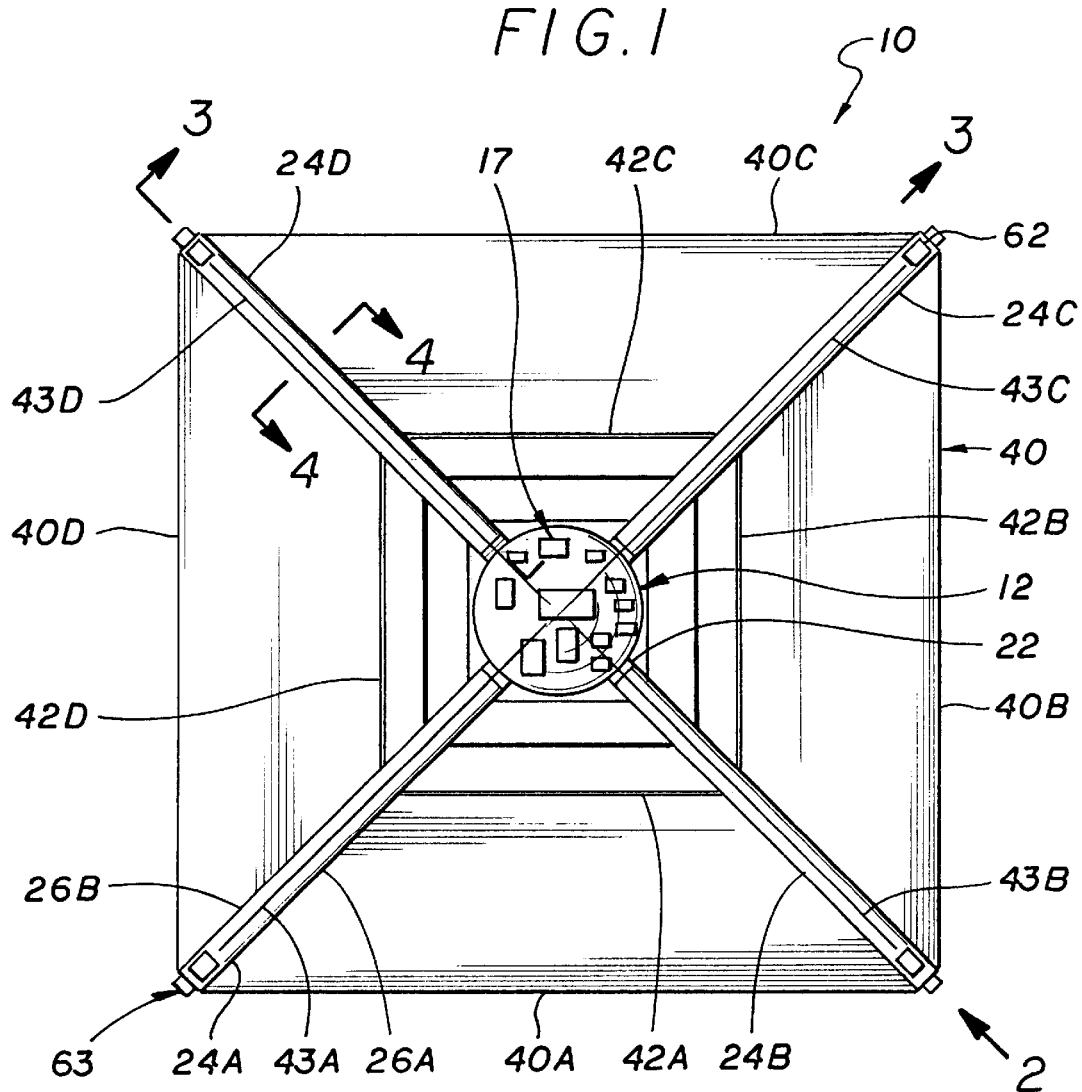
FIG. 1 is a top view of a first embodiment of the satellite.
Figure 2:
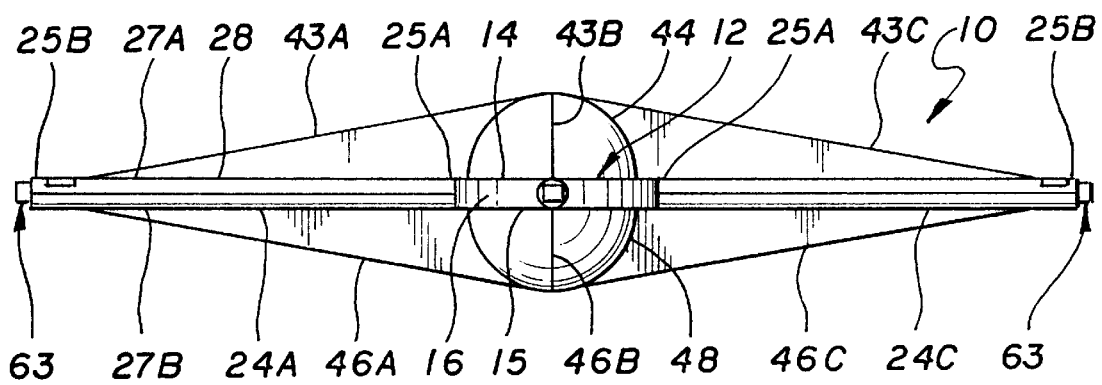
FIG. 2 is a side view of the first embodiment of the satellite shown in FIG. 1 taken along the arrow 2.

Referring to FIGS. 1–3, the satellite, generally indicated by numeral 10 includes a central circular housing 12 having a top surface 14, bottom surface 15 and peripheral side surface 16 and contains the satellite payload 17. The housing 12 includes four tubular mounting members 22 that extend from the peripheral side surface 16 equally spaced at 90 degrees to each other. Mounted to each of the four members 22 are flexible tubes 24A, 24B, 24C and 24D, each having first and second ends 25A and 25B, respectively, having side surfaces 26A and 26B and top and bottom surfaces 27A and 27B. Preferably the tubes 24A–D are made of an outer layer 28 of a material such as polyimide, for example Kapton® manufactured by E. I. DuPont de Nemours & Company, Williamsburg, Del. Such materials can serve as a pressure barrier. The inner layer 30 is made of a fiber-reinforced layer impregnated with an ultraviolet radiation curable resin. The inner layer 30 can be made of such materials as a liquid crystal thermotropic (melt spun) polyester polyarylate fiber, for example VECTRAN® manufactured by Hoechat Celanese, Charlotte, N.C. or SPECTRA® manufactured by Allied Signal, Petersberg, Va. to carry the axial loads. Another high strength material is lyotropic (solvent spun) aromatic polyaramide fiber, such as KEVLAR®, which is manufactured by E. I. DuPont de Nemours & Company.

There are any number of usable ultra-violet radiation curable resins, for example U.S. Pat. No. 4,999,136, entitled "Ultra Violet Curable Conductive Resin" by W. A. Su, et al discloses a suitable resin. The first end 25A of the tubes 24A–D are bonded to the member 22 and are additionally secured by clamps 32, while the second end 25B is bonded to an end cap 34 and additionally secured with a clamp 36. Bonding can be accomplished by exposing the ends 25A and 25B only to ultra-violet radiation. This is easily accomplished by masking off all of the tubes 24A–D excepting the ends. Other types of tube rigidizing methods can be used, including mechanical reinforcements.

A web 40, made up of four sections 40A, 40B, 40C and 40D made of a flexible cloth such as polyimide, is joined to the tubes 24A–D. For example section 40A is joined to side surfaces 26A and 26B, respectively of tubes 24A and 24B, section 40B is joined to side surfaces 26A and 26B, respectively of tubes 24B and 24C, section 40C is joined to side surfaces 26A and 26B, respectively, of tubes 24C and 24D, and section 40D is joined to sides 26A and 26B, respectively, of tubes 24D and 24A, forming a square, and is bonded to the tubes at its sides 26A and 26B by forming simple lap joints 41 using a pressure sensitive adhesive. A suitable polyimide web 32 material is again Kapton®. Bonded to the web 32 are solar array panels 42A, 42B, 42C and 42D partially covering the web.

Additionally, triangular shaped webs 43A, 43B, 43C, and 43D are bonded to the top surfaces 27A and to an inflatable hemispherical shaped cover 44 mounted on the top surface 14 of the housing 12. Triangular shape webs 46A, 46B, 46C and 46D are bonded to the bottom surfaces 27B of the tubes 24A–D and to a second hemispherical shaped cover 48 mounted on the bottom surface 15 of the housing 12. The hemispherical shaped covers 44 and 48 also comprise an outer polyimide layer 50 and an inner ultra-violet resin impregnated fiber-reinforced layer 51. The webbing 43A–D and 46A–D are also bonded to the covers 44 and 48, respectively, by simple lap joints 52 (best seen in FIG. 3). Bonding is accomplished in a manner similar to the sections 40A–D of the web 40.

Figure 5:
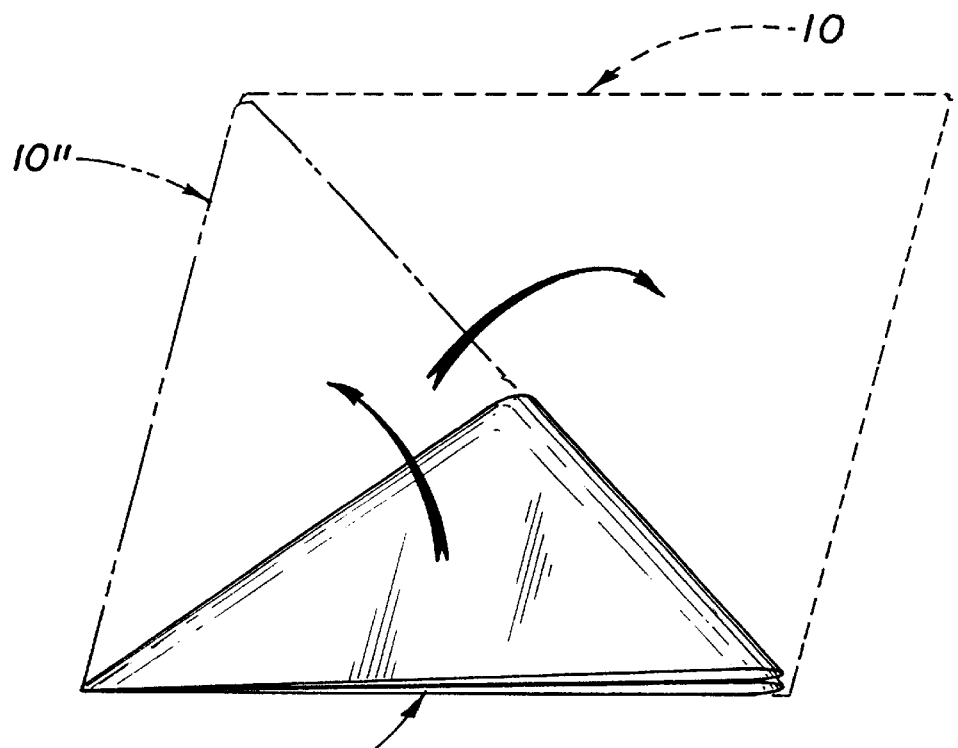
FIG. 5 is view of the satellite shown in FIG. 1 illustrating the satellite in the stored position and in the intermediate steps to the deployed position.
Figure 6:
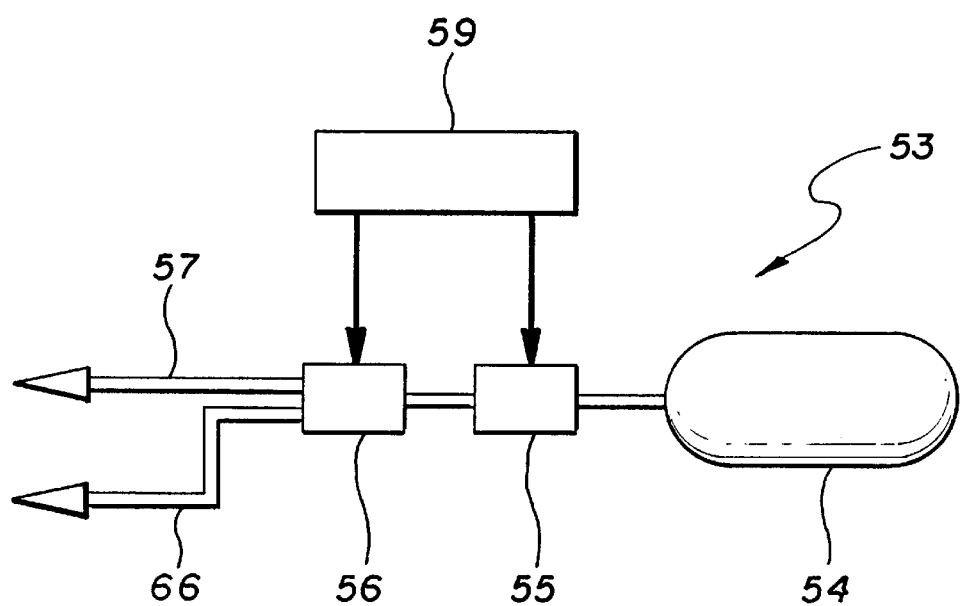
FIG. 6 is a schematic of a pressurization system for inflating the satellite from the stored position to the deployed position.

The referring to FIGS. 1–4 and additionally to FIGS. 5 and 6, the stored satellite 10' is opened therefrom through an intermediate position 10" and to the open position 10 by a stored gas system 53 comprising a pressurized gas source 54 coupled to a control valve 55 and regulator 56 via line 57. Line 57 connects to the port 58 and to the interior of the covers 44 and 48 (best seen in FIG. 3). An electronic controller 59 controls the system 53. Thus upon opening of the valve 55, the tubes 24A–D and hemispherical shaped covers 44 and 48 are pressurized and expand and become rigid. Once in space, the resin impregnating the inner layer 30 of tube 24 becomes cured by exposure to the ultra-violet radiation from the sun and the inner layer also rigidizes the tube. Thus if gas pressure is lost over time, the tubes 24A–D will still remain rigid. It should be noted that solid-state gas generation systems can also be used. In addition, mechanical rigidizing systems are usable.

The cap 34 at the end of the tubes 24A–D can be used to mount global positioning antennas 62, and the like as well as attitude control system 63 having nozzles 64. These can be connected to the housing 12 by means of control system line assemblies 67 and 66, respectively. The attitude control system 63 could use gas from the stored gas system 53, for once the inner layer 30 is rigid, the gas is no longer required for rigidization. The covers 44 and 48, which have also been inflated, also become permanently rigid, causing the triangular shaped webs 43A–D and 46A–D to become taut. These triangular shaped webs 43A–D and 46A–D help in reacting the thrust loads caused by the attitude control system 63.

Figure 7:
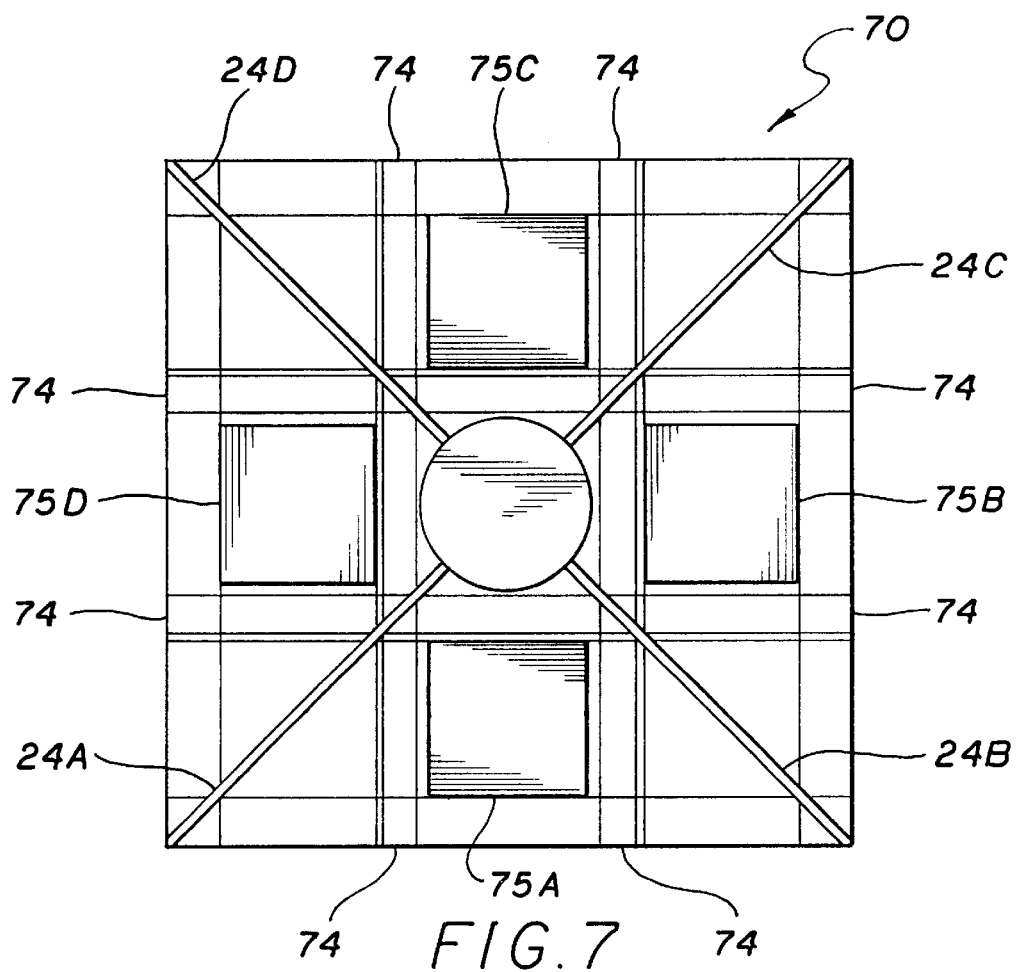
FIG. 7 is a top view of a second embodiment of the satellite.
Figure 8:
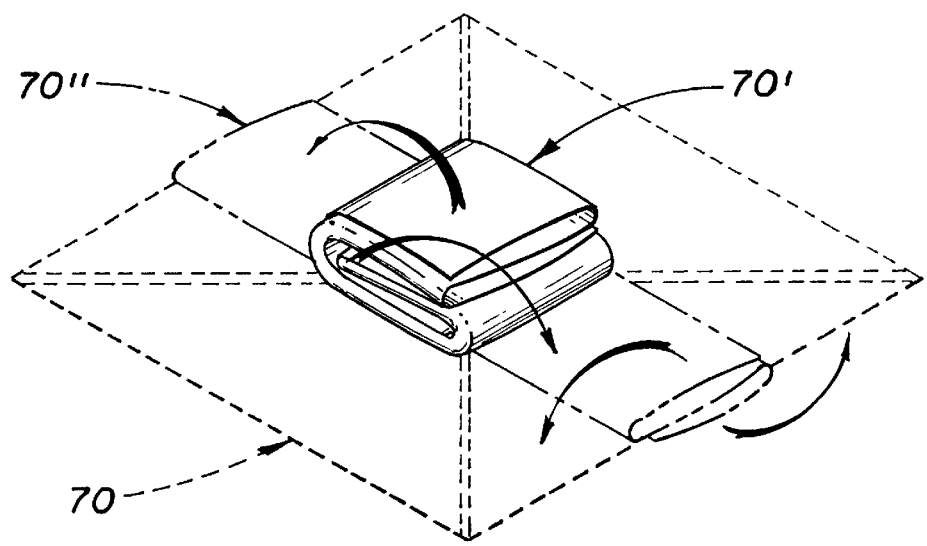
FIG. 8 is a view of satellite shown in FIG. 7 in the stored condition and in the intermediate steps to the deployed position.

A second embodiment of the satellite is illustrated in FIGS. 7 and 8, generally indicated by numeral 70, and is essentially similar to the first embodiment shown in FIGS. 1–5, except for the placement of the solar panels and method of storing and deployment. Thus all similar items remain as previously identified. The satellite 70 includes the same central circular housing 12 and tubular members 24A–D. However, the difference here is the four segments 40A–D of the web 40 include rigid solar panels 75A, 75B, 75C, and 75D in a grid pattern having spaces 74 therebetween. Referring particular to FIG. 8 the satellite is stored in the stored position, indicated by reference numeral 70' wherein the web 40 is folded along spaces 74 so that the solar panels 75A–D are not bent during launch and release into orbit. Upon reaching orbit, the satellite 70' is initially opened to an intermediate position 70" and finally to the fully open position 70. In all other attributes, the satellite 70 is similar to the satellite 10.

While the invention has been described with reference to particular embodiments, it should be understood that the embodiments are merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to the satellite manufacturing industry.

What is claimed is:

1. A satellite assembly comprising:
   a foldable sheet;
   a housing for containing a payload of the satellite assembly mounted at a center of said sheet;
   a housing cover mounted on the housing, the housing cover including a top surface and a bottom surface;
   a plurality of inflatable tubular members coupled at a first end to said housing and along a length thereof to said sheet and having a second end terminating at a periphery of said sheet, said tubular members being movable from a collapsed condition to an inflated condition;
   a plurality of flat solar panels attached to said sheet, said plurality of flat solar panels being attached to said sheet in a manner allowing said sheet to be folded; and
   a plurality of radially extending webs, one of the webs being attached to an upper surface of each tubular member and the top surface of the housing cover and one of the webs being attached to a bottom surface of each tubular member and the bottom surface of the housing cover, the webs being perpendicular to the sheet when the tubular members are inflated.

2. The satellite assembly as set forth in claim 1 including means to internally pressurize said tubular members such that they become inflated.

3. The satellite assembly as set forth in claim 2 further including means to rigidize said tubular members, such that they remain in said inflated condition without internal pressurization.

4. The satellite assembly as set forth in claim 3 wherein said means to rigidize said tubular members includes a coating of ultra-violet curing resin on interior surfaces of said tubular members, such that when the satellite assembly is placed in orbit, exposure to ultra-violet radiation from the sun cures said resin coating, thereby rigidizing said tubular members.

5. The satellite assembly as set forth in claim 4 wherein said solar panels are mounted about a portion of the foldable flexible sheet in connection to said housing.

6. The satellite assembly as set forth in claim 4 wherein said solar panels comprise a series of rectangular shaped panels mounted in a space relationship such that said foldable flexible sheet is foldable along spaces between said rectangular shaped panels.

7. The satellite assembly as set forth in claim 1, or 2, or 3, or 4, or 5, or 6, wherein:
said foldable flexible sheet is rectangular shaped and wherein the satellite assembly further comprises:
four inflatable tubular members extending from said housing to corners of said rectangular foldable flexible sheet.

8. The satellite assembly as set forth in claim 1, wherein said plurality of tubular members are disposed in a common plane.

9. The satellite assembly as set forth in claim 1, wherein said sheet comprises a plurality of separate web sections disposed between each adjacent pair of said plurality of inflatable tubular members when said plurality of inflatable tubular members are in said inflated condition, wherein each of said plurality of web sections is attached to only two of said plurality of inflatable tubular members.

10. The satellite assembly as set forth in claim 9, wherein each of said plurality of inflatable tubular members comprises the upper surface, a lower surface, and a pair of side surfaces, wherein each of said plurality of separate web sections are attached to a side surface of its corresponding pair of said plurality of inflatable tubular members.

11. The satellite assembly as set forth in claim 1, wherein said housing comprises the top surface, the bottom surface, and a peripheral side surface, wherein said plurality of inflatable tubular members extend away from said peripheral side surface of said housing when said plurality of tubular members are in said inflated condition, and wherein the housing comprises first and second inflatable covers disposed over said top and bottom surfaces of said housing.

12. The satellite assembly as set forth in claim 11, wherein said radially extending webs are attached to a first inflatable cover and a second inflatable cover.

13. A satellite assembly comprising:
at least one foldable sheet;
a housing for containing a payload of the satellite assembly mounted at a center of said sheet;
a plurality of inflatable tubular members radially extending from the housing, the tubular members being open at a first end proximal to the housing to receive an inflating medium and being closed at a second closed end distal to the housing at a periphery of the sheet, the tubular members being movable from a collapsed condition to an inflated condition, the at least one foldable sheet being attached to the tubular members and extending unencumbered between adjacent tubular members; and
a plurality of flat solar panels attached to the sheet in a manner allowing the sheet to be folded.

14. The satellite assembly according to claim 13, further comprising:
a housing cover mounted on the housing, the housing cover including a top surface and a bottom surface; and
a plurality of radially extending webs, one of the webs being attached to an upper surface of each tubular member and the top surface of the housing cover and one of the webs being attached to a bottom surface of each tubular member and the bottom surface of the housing cover, the webs being perpendicular to the at least one sheet when the tubular members are inflated.

* * * * *

UNITED STATES PATENT AND TRADEMARK OFFICE
CERTIFICATE OF CORRECTION

PATENT NO. : 6,568,640 B1
DATED : May 27, 2003
INVENTOR(S) : David M. Barnett

It is certified that error appears in the above-identified patent and that said Letters Patent is hereby corrected as shown below:

<u>Column 5,</u>
Line 20, "a lower surface," should read -- the lower surface, --.

Signed and Sealed this

Twenty-first Day of September, 2004

JON W. DUDAS
*Director of the United States Patent and Trademark Office*